United States Patent [19]

Tung

[11] Patent Number: 5,064,146
[45] Date of Patent: Nov. 12, 1991

[54] PIVOTING SEAT FOR FIGHTER AIRCRAFT

[75] Inventor: Chi Tung, Plymouth Meeting, Pa.

[73] Assignee: The United States of America as represented by the Secretary of the Navy, Washington, D.C.

[21] Appl. No.: 589,703

[22] Filed: Sep. 26, 1990

[51] Int. Cl.⁵ .............................................. B64D 25/02
[52] U.S. Cl. ............................. 244/122 R; 244/122 A
[58] Field of Search ........ 244/122 R, 122 A, 122 AE, 244/122 AG, 122 AH

[56] References Cited

U.S. PATENT DOCUMENTS

| | | | |
|---|---|---|---|
| 3,826,434 | 7/1974 | Von Beckh | 244/122 R |
| 3,981,465 | 9/1976 | Sinnett et al. | 244/122 R X |
| 4,004,763 | 1/1977 | Bunnell, III et al. | 244/122 R |
| 4,301,983 | 11/1981 | Horan | 244/122 R |
| 4,787,576 | 11/1988 | McGrady et al. | 244/122 R |

Primary Examiner—Joseph F. Peters, Jr.
Assistant Examiner—Carla Mattix
Attorney, Agent, or Firm—James V. Tura; James B. Bechtel; Susan E. Verona

[57] ABSTRACT

A high-performance aircraft seat is disclosed that automatically reacts to recline the pilot as the aircraft experience higher G's in the vertical direction, or along the pilot's Z-axis. The seat, consisting of a seat pan joined to a seat back, is hingedly fixed, at a point forward of the pilot/seat combination center of gravity, to the surface. An hydraulic cylinder is fixed between the surface, aft of the hinge point, and the seat back and will react to return the seat to its initial position, from a "G-force" induced reclining position, whenever the "G" forces subside.

8 Claims, 4 Drawing Sheets

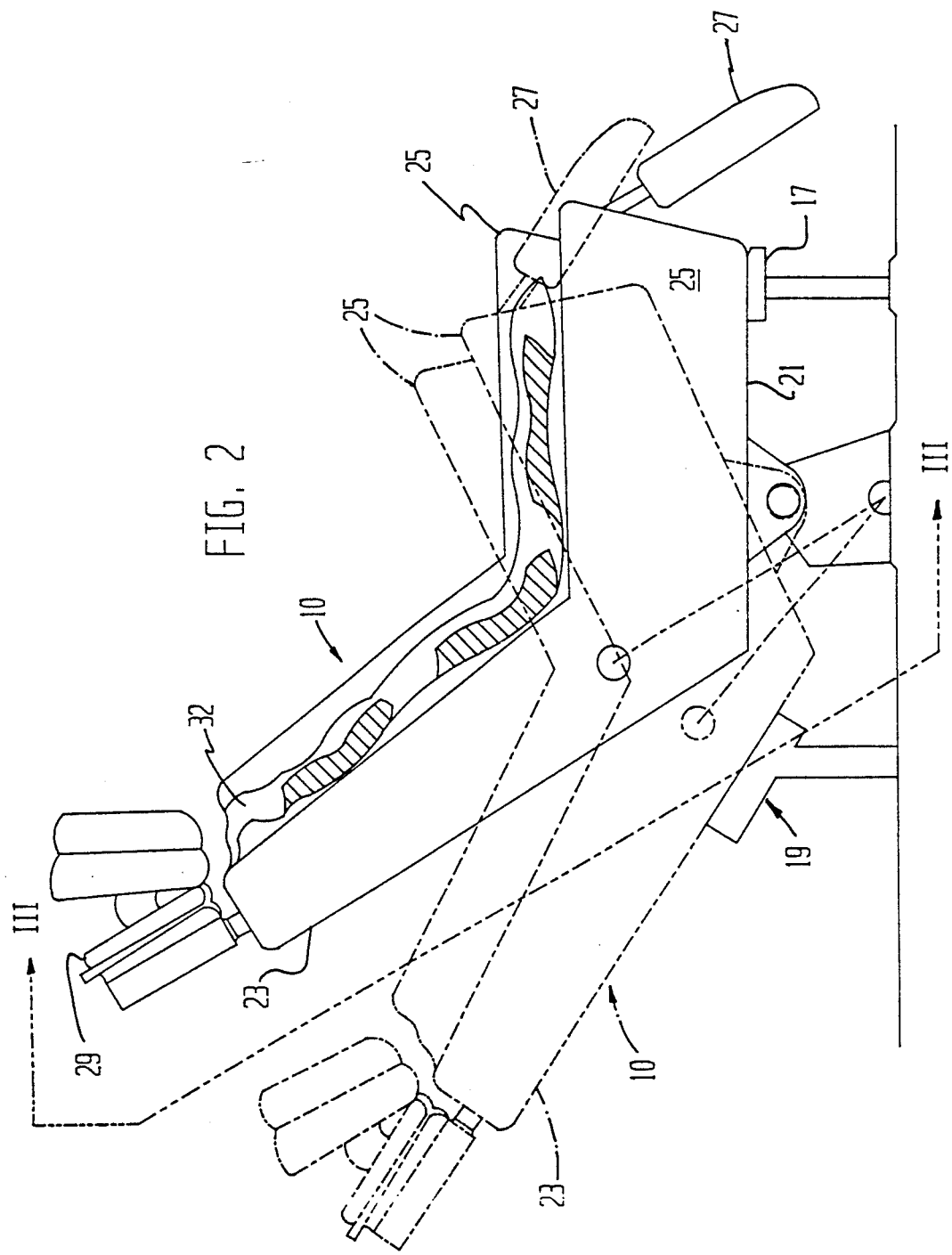

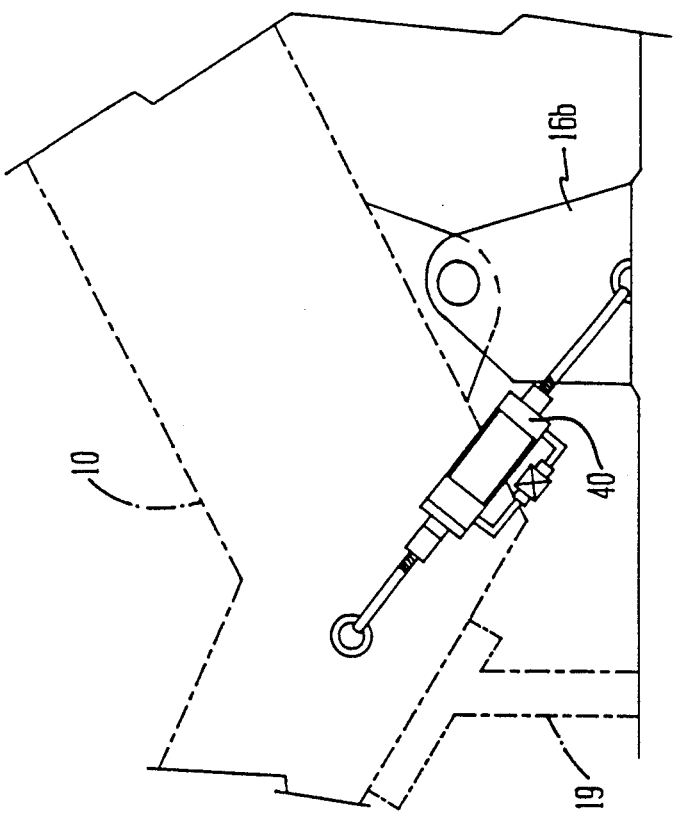
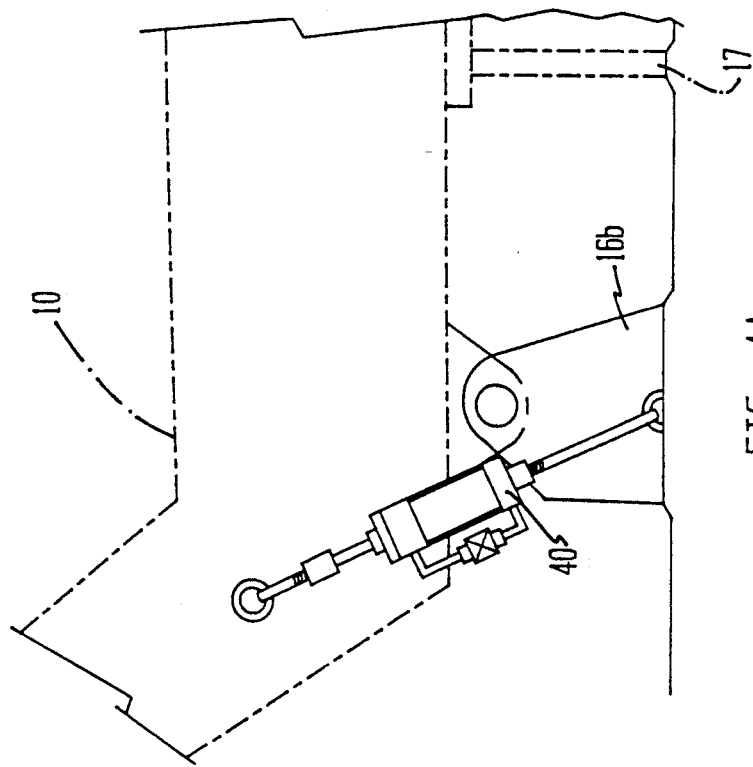

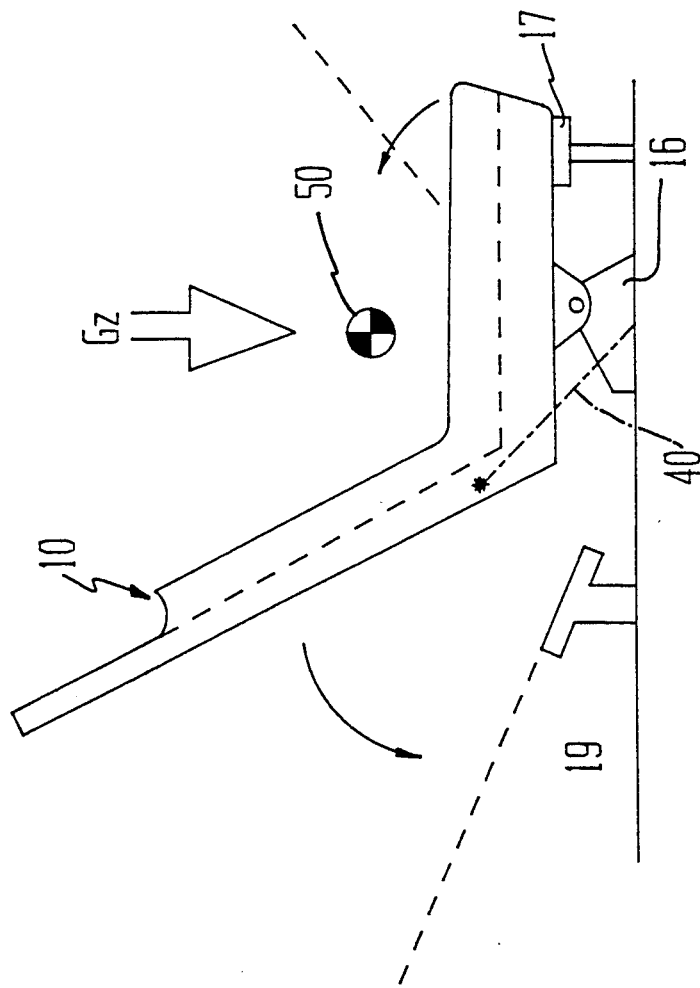
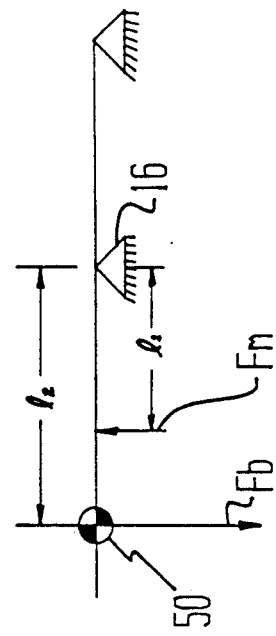
FIG. 5A
FIG. 5B
BALANCE CONDITIONS
$(Fb)\ell_2=(Fn)\ell_s$

PIVOTING SEAT FOR FIGHTER AIRCRAFT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Designers of military aircraft have been, over the years, more and more successful in building aircraft that fly many times the speed of sound and can withstand high "G" forces. When such aircraft enter a sharp turn or climb at these high speeds, as often happens in combat maneuvers, its flightpath forms a curve and the pilot experiences a "G" force higher than one times the force of gravity (also known as 1 G) due to excess acceleration. Although the airframe and engines may continue to perform in very high G manuevers, the tolerance of a pilot seated erectly at the controls is limited to both the duration and severity of the resulting force. The hydrostatic forces on his blood cause it to collect away from the brain, leading to "greyout" or blackout. If cerebral dysfunction, caused by lack of $O_2$ to the brain, of the pilot were to occur, the result could be catastrophic, to include loss of the pilot and loss of the aircraft, or much worse, loss of life or property on the ground.

One of the better known methods of lessening these effects on the pilot is to wrap his lower body in bladders, otherwise known as "G" suits, that inflate or deflate according to sensors that detect changes in the force of gravity. U.S. Pat. No. 4,243,024 to Richard J. Crosbie et al. shows an example of a gravity protective system that includes a pressurized suit.

Another method and apparatus known in the art is to rotate the pilot's seat, to place him in a supine position during the highest G's, based upon a complicated device that acts to fold the pilot's legs into a tucked position and then rotates the seat about the Z—or vertical axis. One such apparatus is disclosed in U.S. Pat. No. 4,301,983 entitled "High Acceleration Protective Seat" issued to J. J. Horan.

Although these methods, and the apparatus they employ, achieve a limited measure of success in keeping the pilot fully conscious during aerial maneuvers, each has shortcomings. For instance, the disadvantage with such "G" suits is that they fail to deal with the problems of compressive forces exerted on the spine by the "g" forces as well as local pressure points located where the pilot's body contacts the seat. With devices that move the pilot's legs and the seat, extra machinery is necessary and this adds to the overall weight of the aircraft.

SUMMARY OF THE INVENTION

It is therefore an object of the present invention to provide a high performance aircraft pilot's seat that protects the pilot from high "G" induced loss of consciousness during high accelerations in the direction normal to the flight path and along the vertical or Z-axis.

It is another object of the present invention to provide such a pilot's seat without adding complicated machinery that will add extra weight to the aircraft and require power from the aircraft's systems to function properly.

It is still another object of the present invention to provide such a pilot's seat which reacts automatically to high "G" forces without the need for external sensors or controls.

These and other objects and advantages are provided by a pilot's seat hingedly fixed to the floor of an aircraft such that the theoretical center of gravity of the pilot and seat combination is aft of the hinge point. A reaction means, such as a self-sustaining hydraulic cylinder maintains the seat in its normal upward position and opposes any backward rotation of the seat about the pivot point due to the force of gravity. The cylinder tends to restore the seat to its initial position whenever the excess "G" forces subside.

BRIEF DESCRIPTION OF THE DRAWINGS

FIG. 2 shows an isolated side view of the pivoting seat in its normal, upright position and in its fully reclined position (in phantom);

FIG. 4a shows a fragmentary cross-sectional view of the pivoting seat (in phantom) showing the reaction means when the pivoting seat is in the upright position;

FIG. 4b shows a view similar to FIG. 4a when the seat is in the reclined position;

FIG. 5A shows a representation of the balance of forces acting on the pivoting seat; and FIG. 5B shows a diagramatic representation of the forces acting on the pivoting seat.

DETAILED DESCRIPTION OF THE PREFERRED EMBODIMENT

Figure 1:
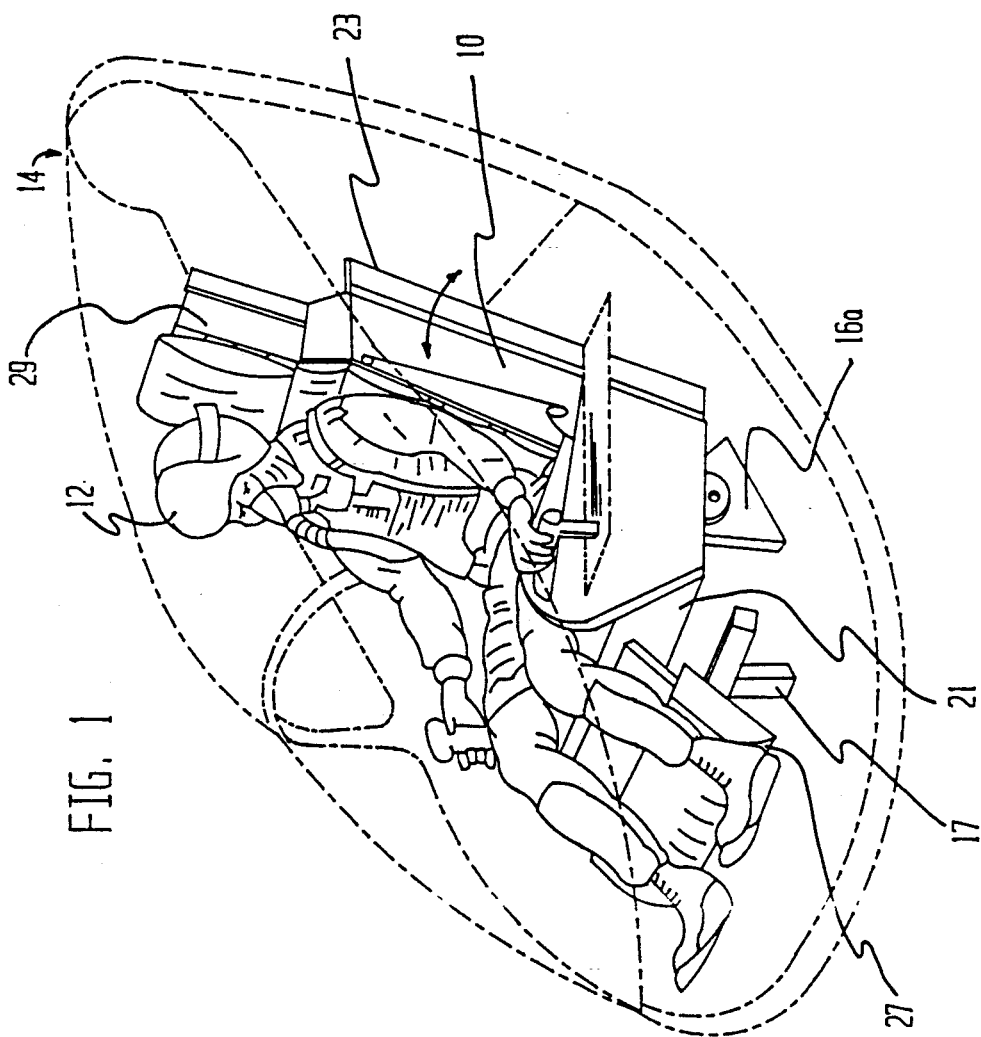
FIG. 1 shows a perspective view of a pilot seated in the pivoting seat in the ejection pod of an advanced fighter aircraft (partially shown in phantom)

Referring now to FIG. 1, the pivoting seat 10 is shown carrying a pilot 12 in its normal operational environment in a pod 14 that may be separated from an aircraft (not shown) by means known in the industry. FIG. 2 shows an isolated side view of seat 10 in its upright position (without the pilot) and in its fully reclined position (in phantom). Seat 10 is mounted to rotate forward and backward, as will be explained, on twin pivot points, or stands 16a, 16b, (16b not shown in FIG. 1) between a front limit stop 17 and a rear limit stop 19 (not shown in FIG. 1). Seat 10 is comprised of a seat pan 21 affixed to a seat back 23 with armrests 25. In an alternate embodiment, seat pan 21 may be hingedly joined to seat back 23, as is known in the art. An optional legrest 27 may also be provided, as well as a headrest 29. Seat 10 is built to overall dimensions of width (from armrest to armrest), height (from bottom of seat pan to top of seat back) and length (from back of seat back to front edge of seat pan) as is standard in the industry and has padding 32 in normal positions as is known.

Figure 3:
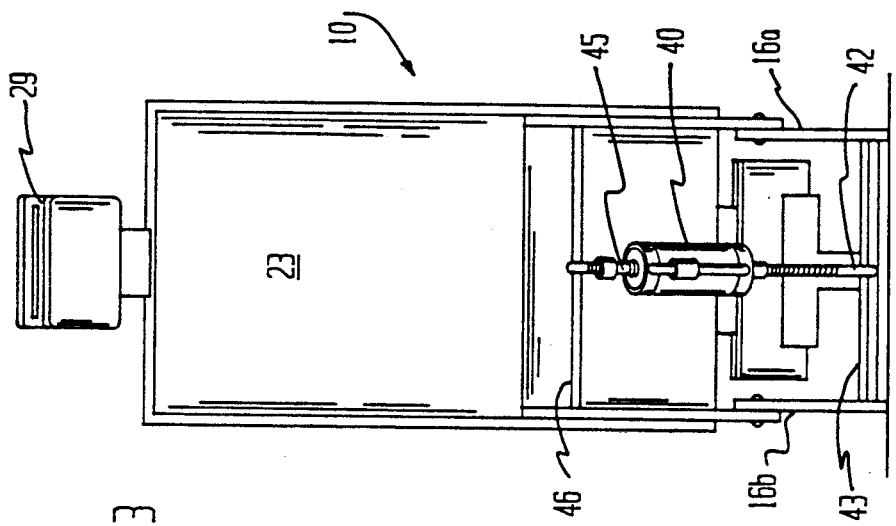
FIG. 3 shows a rear view of the pivoting seat taken along lines III—III of FIG. 2.

FIG. 3 shows a rear view of seat 10, as taken along line III—III of FIG. 2, and shows the reaction means 40 used to balance seat 10. Means 40 can be an hydraulic cylinder, such as the series HD model made by the Parker Hannifin Corporation, or similar models. The lower piston rod 42 is anchored to the floor of the pod 14 or to a bar 43 extending between stands 16a, 16b, and the upper piston rod 45 is fixed to an upper bar 46 extending between the seat back framework a predetermined distance aft of the theoretical center of gravity (CG) 50 (FIG. 5A) of the seat/pilot combination.

FIGS. 4A and 4B show fragmentary diagrammatic side views of seat 10 (in phantom) and means 40 as they appear when the seat is in the upright position (FIG. 4A) and in the fully reclined position (FIG. 4B). The hydraulic cylinder 40 is, as is known in the art, biased to a prespecified pressure to maintain seat 10 in its upright position and allow seat 10 to recline only after a predetermined "G" level is reached.

FIGS. 5A and 5B depict graphically the movement and reaction of the seat 10 and pilot combination whenever the aircraft encounters "G" forces in the vertical or "Z" direction. The pivoting seat 10 has an applied mechanical force $F_m$ due to hydraulic cylinder 40 balanced against a body force $F_B$. The body force $F_B$ will change according to the level of G encountered while $l_1$, and $F_m$ remain constant. Seat 10 pivots fore and aft at stands 16a, 16b, which are placed a distance $l_2$ from the theoretical CG 50. The mechanical force $F_m$ in means 40 necessary to counter the forces due to increased gravity is $F=(k)(mg)(l_2/l_1)$ where mg is the weight of the pilot/seat combination and k is the number of G's less than a human can withstand, according to physiological conditions. Whenever a G level higher than k is encountered, seat 10 will tilt back. The higher the G level, the faster the seat will respond. Mechanism 40 will cause seat 10 to return back to its original position when the high G level subsides.

Finally, while the pivoting seat has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

What I claim is:

1. A seat for a pilot of an aircraft being in an initial predetermined position in the cockpit of the aircraft, comprising:

a seat back oriented in the substantially vertical direction, and a seat pan oriented in the substantially horizontal direction, said seat being attached to the floor of the cockpit by pivot means located forward of the combined pilot and seat center of gravity; and self-sustaining reaction means attached between a second predetermined location on the floor, aft of said pivot means, and said seat, such that on occurance of an acceleration force that moves the center of gravity away from said initial position in the direction of the force and adds energy to said self-sustaining means, said seat is restored back to substantially the initial position by said reaction means, without addition of energy from an external source, upon a lessoning of the acceleration force.

2. A seat as described in claim 1 wherein said seat is installed in an ejection pod.

3. A seat as described in claim 1 wherein said pivot means comprises two oppositely-disposed stands affixed to the floor.

4. A seat as described in claim 1 and further comprising limit means affixed to the floor to restrict forward or backward motion by the seat.

5. A seat as described in claim 4 wherein said limit means comprises a front stop affixed to a predetermined location on the floor forward of the seat and a rear stop affixed to a predetermined location on the floor aft of the seat.

6. A seat as described in claim 5 and further comprising a legrest extending from said seat pan.

7. A seat as described in claim 1 wherein said reaction means comprises a hydraulic cylinder.

8. A seat for a high-performance aircraft comprising:

a seat pan and a seat back connected to carry a pilot;

a pair of stands affixed to the floor of the aircraft, said seat pan being hingedly connected thereto;

a self-sustaining hydraulic cylinder connected between a predetermined location on the floor and a predetermined location on said seat back;

a legrest extending forward from said seat pan; and a front and a rear stop located on the floor forward and aft, respectively, of the seat.

* * * * *